United States Patent
Lee et al.

(10) Patent No.: US 9,862,178 B2
(45) Date of Patent: Jan. 9, 2018

(54) APPARATUS FOR FEEDING/DISCHARGING FILAMENT FOR 3D PRINTER

(71) Applicant: SINDOH CO., LTD., Seoul (KR)

(72) Inventors: Byung Bag Lee, Seoul (KR); Jae Han Park, Seoul (KR); Kyu Hoon Han, Seoul (KR)

(73) Assignee: SINDOH CO., LTD., Seoul (KR)

( * ) Notice: Subject to any disclaimer, the term of this patent is extended or adjusted under 35 U.S.C. 154(b) by 273 days.

(21) Appl. No.: 14/933,415

(22) Filed: Nov. 5, 2015

(65) Prior Publication Data
US 2016/0332377 A1 Nov. 17, 2016

(30) Foreign Application Priority Data
May 13, 2015 (KR) .......................... 10-2015-0066579

(51) Int. Cl.
*B29C 67/00* (2017.01)
*B33Y 30/00* (2015.01)
(Continued)

(52) U.S. Cl.
CPC ............ *B33Y 30/00* (2014.12); *B29C 64/106* (2017.08); *B29K 2105/0067* (2013.01)

(58) Field of Classification Search
CPC ............ B29C 67/0086; B29C 67/0055; B29C 64/321; B29C 64/106; B29C 64/18;
(Continued)

(56) References Cited

U.S. PATENT DOCUMENTS

| | | | | |
|---|---|---|---|---|
| 6,085,957 A | * | 7/2000 | Zinniel | B65H 51/30 226/43 |
| 7,063,285 B1 | * | 6/2006 | Turley | B29C 64/106 242/171 |

(Continued)

*Primary Examiner* — Jason L Lazorcik
(74) *Attorney, Agent, or Firm* — Nixon & Vanderhye P.C.

(57) ABSTRACT

Provided is an apparatus for feeding/discharging a filament for a 3D printer, including a filament supply part which winds the wire-shaped filament and supplies the wound filament; a filament output part which outputs a three-dimensional printed matter by melting and discharging the filament supplied from the filament supply part; and a driving part which supplies the filament from the filament supply part to the filament output part, and discharges the filament from the filament output part toward the filament supply part, wherein the driving part includes a driving motor which is provided at the filament output part to generate a driving force and thus to adapt the filament to be conveyed in a normal direction or a reverse direction; a driving roller which is provided at the filament output part to receive the driving force of the driving motor and to convey the filament in the normal direction or the reverse direction; a conveying roller which is provided at the filament supply part to receive the driving force of the driving motor and to convey the filament in the normal direction or the reverse direction; and transmission gears which are provided between the driving motor and the driving roller and between the driving motor and the conveying roller to transmit the driving force of the driving motor to the driving roller and the conveying roller. Therefore, the filament can be accurately supplied to the extruder, and the fixed filament can be easily discharged from the extruder.

20 Claims, 4 Drawing Sheets

(51) Int. Cl.
*B29C 64/106* (2017.01)
*B29K 105/00* (2006.01)

(58) Field of Classification Search
CPC ..... B29C 64/20; B29C 64/209; B29C 64/118;
B29C 64/307; B29C 64/343; B33Y
10/00; B33Y 30/00; B33Y 40/00
See application file for complete search history.

(56) References Cited

U.S. PATENT DOCUMENTS

| | | | | |
|---|---|---|---|---|
| D633,916 S | * | 3/2011 | Taatjes | D14/475 |
| 8,052,078 B2 | * | 11/2011 | DeLuca | B65H 49/322 |
| | | | | 242/170 |
| D650,787 S | * | 12/2011 | Taatjes | D14/475 |
| D737,347 S | * | 8/2015 | Anantha | D14/475 |
| 9,126,365 B1 | * | 9/2015 | Mark | B29C 70/20 |
| 9,126,367 B1 | * | 9/2015 | Mark | B29C 70/20 |
| D747,374 S | * | 1/2016 | Anantha | D14/475 |
| 9,592,530 B2 | * | 3/2017 | Rodgers | C08L 77/02 |
| 9,714,153 B2 | * | 7/2017 | Beery | B65H 49/36 |
| 9,714,318 B2 | * | 7/2017 | Jaker | C08G 63/06 |
| 9,744,722 B2 | * | 8/2017 | Rodgers | B29C 64/112 |
| 9,764,514 B2 | * | 9/2017 | Albert | B29C 64/20 |
| 2001/0030383 A1 | * | 10/2001 | Swanson | B29C 41/36 |
| | | | | 264/308 |
| 2007/0001050 A1 | * | 1/2007 | Taatjes | B65H 49/322 |
| | | | | 242/598.6 |
| 2010/0096485 A1 | * | 4/2010 | Taatjes | B29C 67/0085 |
| | | | | 242/171 |
| 2010/0096489 A1 | * | 4/2010 | Taatjes | B65H 75/28 |
| | | | | 242/520 |
| 2011/0121476 A1 | * | 5/2011 | Batchelder | B65H 49/322 |
| | | | | 264/40.1 |
| 2013/0161432 A1 | * | 6/2013 | Mannella | B65H 57/12 |
| | | | | 242/171 |
| 2013/0161439 A1 | * | 6/2013 | Beery | B65H 49/322 |
| | | | | 242/396.1 |
| 2013/0161442 A1 | * | 6/2013 | Mannella | B29C 67/0055 |
| | | | | 242/598 |
| 2014/0159273 A1 | * | 6/2014 | Koop | B65H 51/10 |
| | | | | 264/129 |
| 2014/0328963 A1 | * | 11/2014 | Mark | B29C 67/0088 |
| | | | | 425/143 |
| 2014/0361460 A1 | * | 12/2014 | Mark | B29C 70/521 |
| | | | | 264/248 |
| 2015/0027239 A1 | * | 1/2015 | Konkle | B65H 63/084 |
| | | | | 73/862.627 |
| 2015/0108687 A1 | * | 4/2015 | Snyder | B29C 64/106 |
| | | | | 264/308 |
| 2015/0165694 A1 | * | 6/2015 | Lee | B29C 67/0096 |
| | | | | 425/225 |
| 2015/0375457 A1 | * | 12/2015 | Mark | B29C 67/0088 |
| | | | | 425/166 |
| 2016/0176108 A1 | * | 6/2016 | Tadin | B29C 67/0055 |
| | | | | 425/375 |
| 2016/0257068 A1 | * | 9/2016 | Albert | B29C 47/92 |
| 2016/0271876 A1 | * | 9/2016 | Lower | B29C 64/106 |
| 2017/0203506 A1 | * | 7/2017 | Hjelsand | B29C 67/0055 |
| 2017/0203507 A1 | * | 7/2017 | Leavitt | B29C 67/0055 |

\* cited by examiner

APPARATUS FOR FEEDING/DISCHARGING FILAMENT FOR 3D PRINTER

This application claims priority to KR10-2015-0066579 filed 13 May 2015, the entire contents of which is hereby incorporated by reference.

TECHNICAL FIELD

The present invention relates to an apparatus for feeding/discharging a filament for a 3D printer, and more particularly, to an apparatus for feeding/discharging a filament for a 3D printer, which is capable of supplying the filament to an extruder, and discharging the fixed filament from extruder.

BACKGROUND ART

In general, for manufacturing a prototype product having a three-dimensional shape, a mock-up manufacturing method which is manually performed based on a drawing, and a manufacturing method through CNC milling have been widely used.

However, since the mock-up manufacturing method is manually performed, it is difficult to accurately perform a numeric control, and also it takes a lot of time. In the case of the manufacturing method through the CNC milling, it is possible to accurately perform the numeric control, but it is difficult to perform a machining operation due to tool interference.

Therefore, recently, a new method referred to as a 3D printing method in which a designer of a product generates three-dimensional modeling data using a CAD or a CAM and a prototype product having a three-dimensional shape is manufactured using the generated data, has been proposed. Such a 3D printer is being used in various fields such as an industrial field, a field of life, and a medical field.

The 3D printer is a manufacturing apparatus which manufactures an object by outputting continuous layers of a material, like in a 2D printer, and then stacking the layers. Since the 3D printer may rapidly manufacture the object based on digitized drawing information, it is mainly used to manufacture a prototype sample or the like.

A product forming method of the 3D printer includes a method in which a laser beam is applied to a photo-curing material, and then a portion to which the laser beam is applied is machined as an object, a method in which a forming material is cut, and a method (a FDM method) in which a thermoplastic filament is melded and stacked.

Since a 3D printer using the method in which the thermoplastic filament is melded and stacked, among the above-described methods, has a lower unit cost of production than 3D printers using other methods, thus it is being popularized for domestic use, industrial use, or the like.

In Korean Patent Publication No. 10-2014-0121034, there is disclosed a 3D printer in which a flexible shaft connected with a motor to transmit power, a feeder roller rotatably connected to the flexible shaft, and a hot end nozzle are included. For this hot end nozzle, a filament is supplied by rotation of the feeder roller and the supplied filament is melted and then sprayed, and the filament is uniformly, stably and rapidly supplied to the hot end nozzle.

Here, in the 3D printer disclosed in the above-described patent document, a user should insert the filament into an extruder, i.e., into the hot end nozzle through the feeder roller in the early stage of use, and such a manual supply method of the filament has the following problems.

First, since an insertion hole of the extruder into which the filament is inserted is very narrow, and also the filament is generally wound and thus has a curved shape, it is not easy to accurately insert the filament into the nozzle via the feeder roller.

Also, when the filament is formed of a ABS plastic material containing harmful ingredients, the user may be exposed to the harmful ingredients, and the filament may also be contaminated due to contact with the user.

And the filament inserted into the extruder may be fixed in the extruder after a printing operation, and thus may cause a clogging phenomenon. In this case, it is very difficult to discharge the filament fixed in the extruder.

DISCLOSURE

Technical Problem

The present invention is directed to providing an apparatus for feeding/discharging a filament for a 3D printer, which is capable of accurately inserting the filament into the extruder, and easily discharging the filament fixed in the extruder.

Also, the present invention is directed to providing an apparatus for feeding/discharging a filament for a 3D printer, which is capable of preventing an end of the filament from being introduced into a filament cartridge, when the fixed filament is discharged in a reverse direction.

Technical Solution

One aspect of the present invention provides an apparatus for feeding/discharging a filament for a 3D printer, including a filament supply part which winds the wire-shaped filament and supplies the wound filament; a filament output part which outputs a three-dimensional printed matter by melting and discharging the filament supplied from the filament supply part; and a driving part which supplies the filament from the filament supply part to the filament output part, and discharges the filament from the filament output part toward the filament supply part, wherein the driving part includes a driving motor which is provided at the filament output part to generate a driving force and thus to adapt the filament to be conveyed in a normal direction or a reverse direction; a driving roller which is provided at the filament output part to receive the driving force of the driving motor and to convey the filament in the normal direction or the reverse direction; a conveying roller which is provided at the filament supply part to receive the driving force of the driving motor and to convey the filament in the normal direction or the reverse direction; and transmission gears which are provided between the driving motor and the driving roller and between the driving motor and the conveying roller to transmit the driving force of the driving motor to the driving roller and the conveying roller.

The filament output part may have a first detecting sensor which detects the filament, and the driving part may have a clutch which is installed between the driving motor and the conveying roller to selectively transmit the driving force of the driving motor to the conveying roller, and when the driving motor is rotated in the normal direction, the clutch may be maintained in an ON state until the first detecting sensor senses the filament, and may transmit the driving force of the driving motor to the conveying roller, and after the first detecting sensor senses the filament, the clutch may be in an OFF state, and when the driving motor is rotated in the reverse direction, the clutch may be always in the ON state.

The filament supply part may include a case which has a filament output port formed at one side thereof; a filament winding bobbin which is rotatably installed at an inside of the case to wind the filament; and the conveying roller which is installed at an opposite side to the filament output port to form a filament conveying passage having a predetermined length or more between the filament output port and the conveying roller.

The conveying roller may include a first roller which is driven by the driving motor; and a second roller which has a larger diameter than that of the first roller, and has a radius overlapped with a part of the radius of the first roller so that a part of the first roller is pressed and deformed.

The filament output part may be an extruder comprising an introduction port through which the filament supplied from the filament supply part is introduced, a heat means which melts the filament introduced through the introduction port, and a discharge port through which the melted filament is discharged, and a funnel-shaped guide member which guides the filament supplied from the filament supply part to the filament output part may be installed at a distal end of the extruder.

The apparatus may further include a tube which extends along a circumference of the filament winding bobbin between the conveying roller and the guide member of the filament output part, and forms a filament conveying passage into which the filament is inserted.

A vertically protruding rib may be provided at a radial end of the filament winding bobbin to prevent the filament from being introduced into a gap between the filament winding bobbin and the case.

A second detecting sensor which detects the presence of the filament may be installed between the introduction port of the extruder and the driving motor, and when the driving motor is rotated in the reverse direction, the driving motor may be driven until the second detecting sensor does not sense the filament.

Advantageous Effects

According to the present invention, the filament can be accurately supplied into the extruder, and the fixed filament can be easily discharged from the extruder.

Also, according to the present invention, when the fixed filament is discharged in the reverse direction, the end of the filament can be prevented from being introduced into the filament cartridge.

MODES OF THE INVENTION

Figure 1:
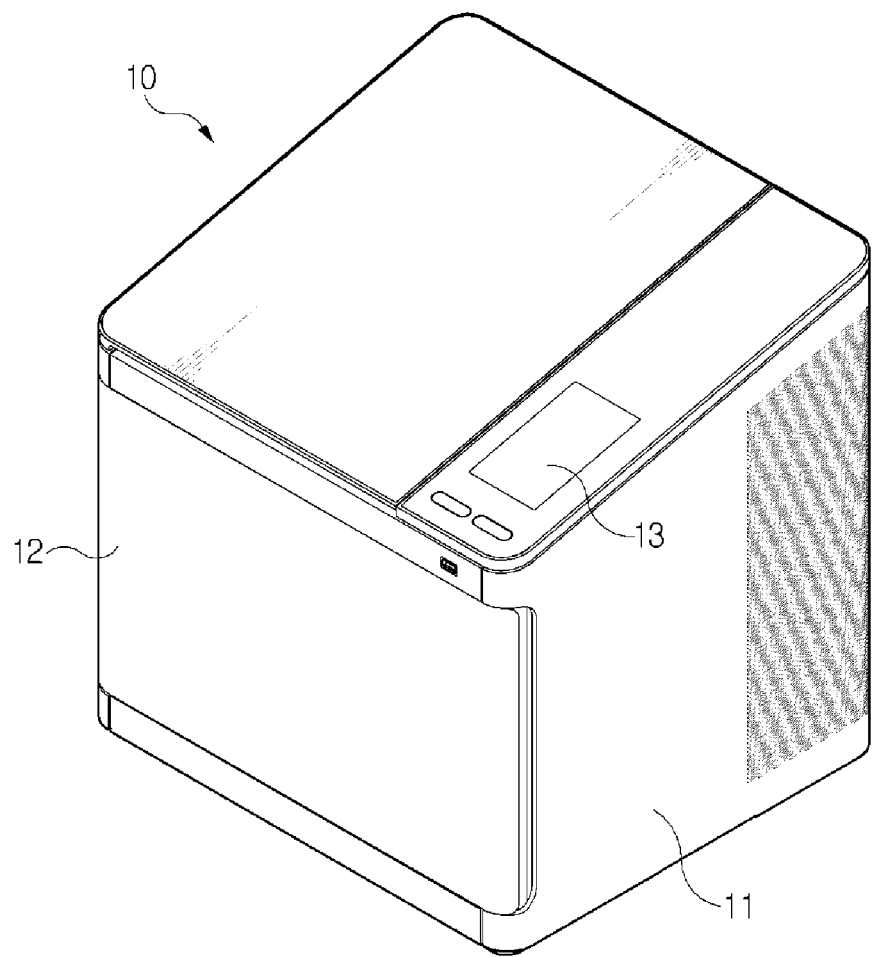
FIG. 1 is a perspective view illustrating a 3D printer having a built-in apparatus for feeding/discharging a filament for the 3D printer according to the present invention.

Referring to FIGS. 1 to 4, an apparatus for feeding/discharging a filament for a 3D printer according to the present invention is an apparatus which is built in a main body 11 of the 3D printer 10, and which outputs a three-dimensional printed matter in a method (a FEM method) in which the filament formed of a thermoplastic plastic material is melted and stacked.

The 3D printer 10 includes a cover 12 provided at a front surface of the main body 11 to open and close the front surface, and an operation panel 13 provided at an upper surface of the main body 11, and the apparatus for feeding/discharging the filament for the 3D printer according to the present invention is built therein.

The apparatus for feeding/discharging the filament for the 3D printer, which is installed at an inside of the main body 11, includes a filament supply part 100, a filament output part 200, and a driving part 300.

The filament supply part 100 serves to wind the wire-shaped filament manufactured of a thermoplastic plastic material, and to supply the wound filament to the filament output part 200.

Specifically, the filament supply part 100 includes a box-shaped case 110, and a filament winding bobbin 120 installed at an inside of the case 110. The case 110 has a filament output port 111 formed at one side thereof to discharge the filament, and a cover (not shown) provided to open and close at a front surface thereof. The case 110 is provided to be removable from the main body 11 of the 3D printer 10. The filament winding bobbin 120 is formed so that the filament is wound between one pair of circular plates which are spaced apart from each other, and rotatably installed at a rotating shaft provided at a center of the case 110.

The filament output part 200 serves to output a three-dimensional printed matter by melting and discharging the filament supplied from the filament supply part 100.

Specifically, the filament output part 200 is an extruder including an introduction port 210 through which the filament supplied from the filament supply part 100 is introduced, a heat means (not shown) which melts the filament introduced through the introduction port 210, and a discharge port 220 through which the melted filament is discharged.

The driving part 300 serves to automatically supply the filament from the filament supply part 100 to the filament output part 200, and to automatically discharge the filament from the filament output part 200 toward the filament supply part 100. That is, the driving part 300 serves to automatically convey the filament in a normal direction (a direction from the filament supply part 100 toward the filament output part 200) for three-dimensional printing and in a reverse direction (a direction from the filament output part 200 toward the filament supply part 100) for discharging the fixed filament.

Specifically, the driving part 300 includes a driving motor 310, a driving roller 320, a conveying roller 330, and transmission gears 341 to 345. The driving motor 310 is provided at the filament output part 200, and generates a driving force so that the filament is conveyed in the normal direction or the reverse direction. The driving roller 320 is provided at the filament output part 200, specifically, at an upstream side (based on a supply direction of the filament) of the driving motor 310 to receive the driving force of the driving motor 310 and to adapt the filament to be conveyed in the normal direction or the reverse direction. The conveying roller 330 is provided at the filament supply part 100, i.e., at the inside of the case 110 to receive the driving force of the driving motor 310 and to convey the filament in the normal direction or the reverse direction. The transmission gear 341 is provided between the driving motor 310 and the driving roller 320 to transmit the driving force of the driving motor 310 to the driving roller 320. Also, the transmission gears 342 to 345 are provided between the driving motor 310 and the conveying roller 330 to transmit the driving force of the driving motor 310 to the conveying roller 330. That is, the driving roller 320 and the conveying roller 330 may be simultaneously driven by one driving motor 310.

Due to such a structure, when the driving motor 310 is driven in the normal direction (in the direction that the filament is conveyed from the filament supply part 100 toward the filament output part 200), the driving roller 320 and the conveying roller 330 are driven in the normal direction, and thus the filament wound on the filament winding bobbin 120 may be automatically conveyed toward the filament output part 200. When driving motor 310 is driven in the reverse direction, the driving roller 320 and the conveying roller 330 are driven in the reverse direction, and thus the filament located at a side of the filament output part 200, i.e., the extruder side may be conveyed toward the filament supply part 100, while the filament is wound on the filament winding bobbin 120. Therefore, the filament may be accurately conveyed into the introduction port 210 of the extruder, and when the filament is fixed in the extruder, the filament may be smoothly discharged.

Preferably, the driving part 300 includes a clutch 360 which is installed between the driving motor 310 and the conveying roller 330, specifically, between the transmission gears 342 and 343 to selectively transmit the driving force of the driving motor 310 to the conveying roller 330. Here, the clutch 350 may be a one-way clutch which transmits power in only one direction due to its mechanical structure, or may be an electromagnetic clutch. The filament output part 200 is provided with a first detecting sensor 230 which detects the filament.

Here, in the apparatus for feeding/discharging the filament for the 3D printer according to the present invention, when the driving motor 310 is driven in the normal direction, the clutch 350 is controlled to be maintained in an ON state until the first detecting sensor 230 detects the filament. Therefore, the driving force of the driving motor 310 is transmitted to the driving roller 320 and the conveying roller 330, and thus the filament is conveyed from the filament supply part 100 toward the filament output part 200. After the first detecting sensor 230 detects the filament, the clutch 350 is controlled to be in an OFF state. Therefore, the driving force of the driving motor 310 is transmitted to only the driving roller 320.

Meanwhile, in the apparatus for feeding/discharging the filament for the 3D printer according to the present invention, when the driving motor 310 is driven in the reverse direction, the clutch 350 is controlled to be always in the ON state. Therefore, when the driving motor 310 is driven in the reverse direction, the driving force of the driving motor 310 is transmitted to both of the driving roller 320 and the conveying roller 330.

Due to such an operation control of the clutch 350, when the filament is supplied in the normal direction, the driving roller 320 and the conveying roller 330 may be simultaneously operated in the early stage, and thus the filament may be output with relatively large power. After that, only the driving roller 320 may be operated, and the filament may be smoothly output. When the filament is discharged in the reverse direction, the driving roller 320 and the conveying roller 330 may be always operated at the same time, and thus the filament may be pulled from the filament output part 200 with relatively large power.

Meanwhile, the case 110 is provided in a cartridge type which is removable from the main body 11 of the 3D printer 10. Since the case 110 is provided in the removable cartridge type, the user may supply the filament to the 3D printer without the need to directly touch the filament. Therefore, the user is not exposed to harmful ingredients, and the filament is also prevented from being contaminated.

Figure 2:
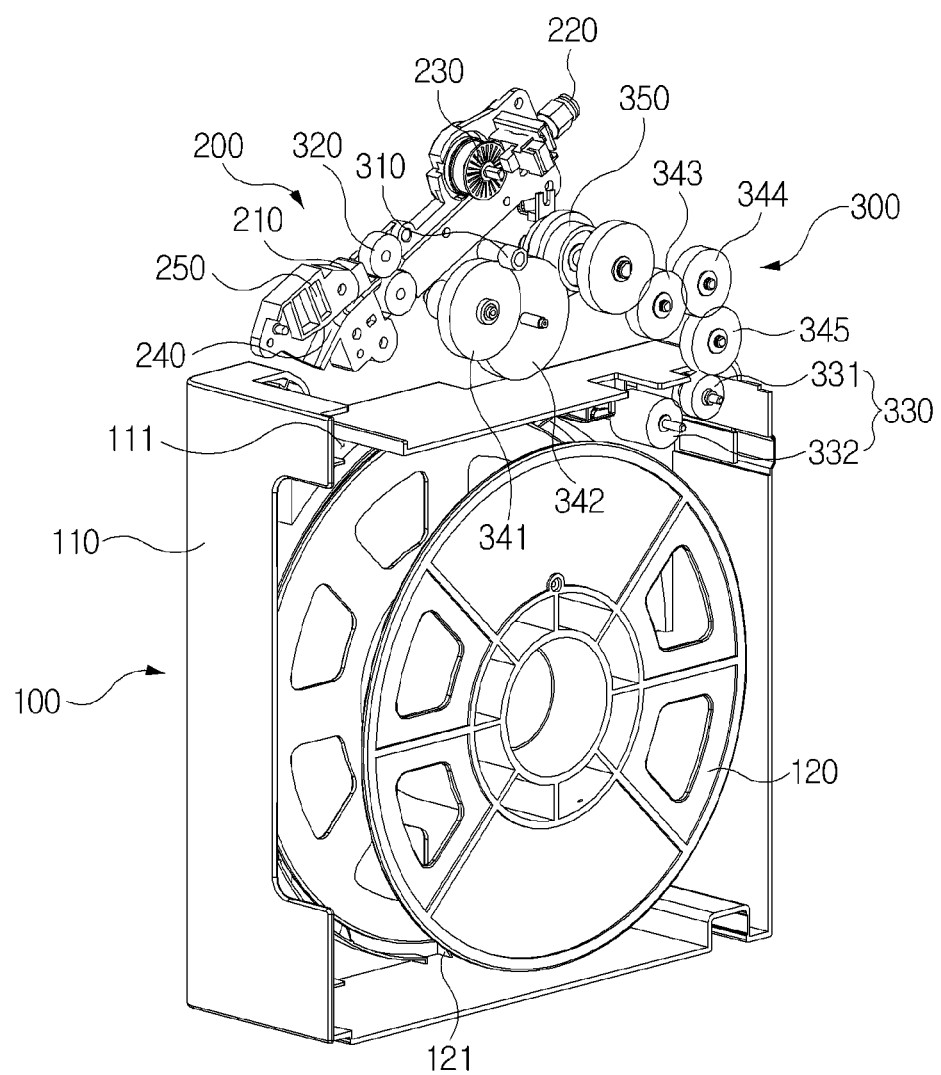
FIG. 2 is a perspective view illustrating the apparatus for feeding/discharging the filament for the 3D printer according to the present invention.
Figure 3:
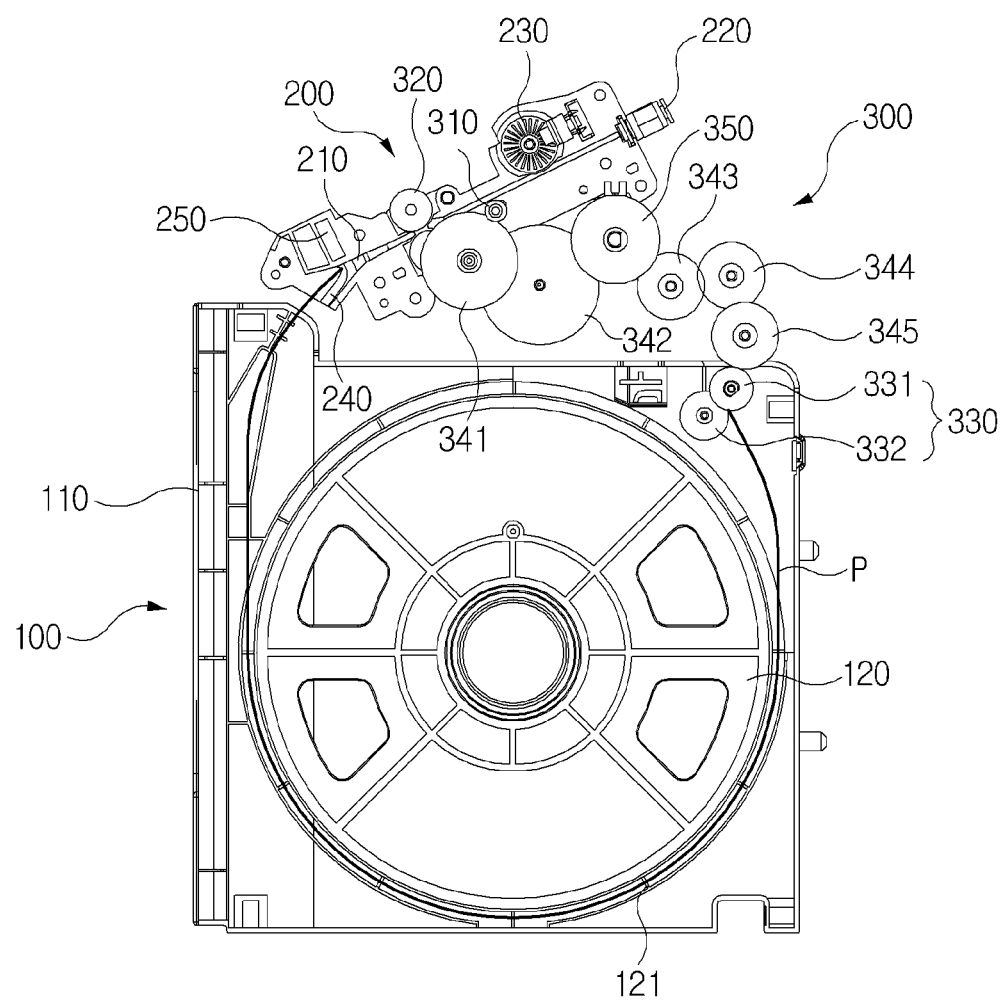
FIG. 3 is a front view illustrating the apparatus for feeding/discharging the filament for the 3D printer according to the present invention.
Figure 4:
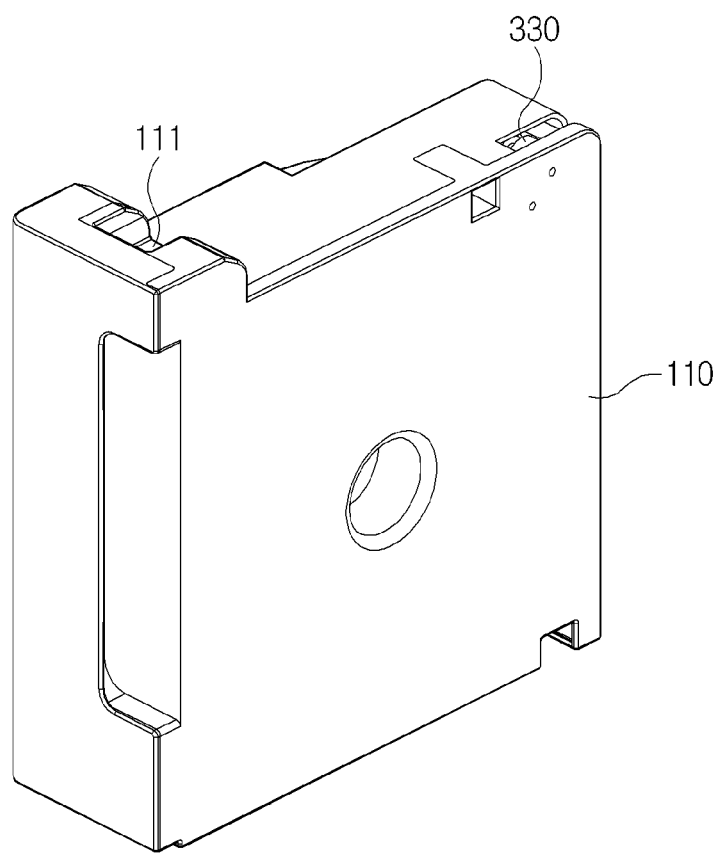
FIG. 4 is a perspective view illustrating the filament cartridge of the apparatus for feeding/discharging the filament for the 3D printer according to the present invention.

Also, it is preferable that the conveying roller 330 is installed at an opposite side to the filament output port 111, instead of the filament output port 111. Referring to FIGS. 2 and 3, the filament output port 111 is provided at a left upper portion of the case 110, and the conveying roller 330 is provided at a right upper portion of the case 110. Therefore, a filament conveying passage P having a predetermined length or more is formed between the filament output port 111 and the conveying roller 330.

When an end of the filament passes through the conveying roller 330 in the reverse direction, it is impossible to convey again the filament in the normal direction, and it is also difficult to insert the filament between the conveying rollers 330. However, in the embodiment, even when the filament is conveyed in the reverse direction, an introduction length is sufficiently ensured due to the above-mentioned filament conveying passage P having the predetermined length or more, and thus the end of the filament may be prevented from passing through the conveying roller in the reverse direction.

Also, since the conveying roller 330 is not exposed from the filament output port 111 to an outside, and is built in the case 110 at the opposite side to the filament output port 111, when the case 110 is separated from the main body 11, the user may not operate the conveying roller 330. That is, the user may not randomly wind the filament at the inside of the case 110, and thus the end of the filament may be prevented from being introduced into the case 110. Furthermore, since the conveying roller 330 not exposed from the filament output port 111 to the outside, and is built in the case 110 at the opposite side to the filament output port 111, a noise generated by an operation of the conveying roller 330 is small.

Meanwhile, referring to FIG. 3, the conveying roller 330 includes a first roller 331 and a second roller 332 which are engaged with each other. The first roller 331 is a driving roller which is connected with the driving motor 310 and to which the driving force is transmitted. The second roller 332 is an idle roller which is not interlocked with the driving motor 310, but is engaged with the first roller 3310 to be rotated by driving of the first roller 331. The second roller 332 has a larger diameter than that of the first roller 331. Here, the first and second rollers 331 and 332 are engaged with each other so that radii thereof are partly overlapped with each other. That is, the first and second rollers 331 and 332 are disposed to be engaged with each other, such that a part of the first roller 331 is pressed and deformed. At this time, the second roller 332 may be formed of a material which is softer than that of the first roller 331, and thus only the second roller 332 may be deformed.

Since the first and second rollers 331 and 332 are disposed so that the radius of the first roller 331 and a part of the radius of the second roller 332 are overlapped with each other, a part of the radius of the second roller 332 is deformed, as illustrated in FIG. 3. Due to such structures of the first and second rollers 331 and 332, the filament conveyed between the first and second rollers 331 and 332 is bent in a direction opposite to a curvature of the filament which is at the time of the filament being introduced into the conveying roller 330, and then passes through the conveying roller 330. Therefore, the filament wound on the filament winding bobbin 120 and thus bent in one direction is somewhat unbent, while passing through the conveying roller 330, and thus the filament may be further accurately supplied to the filament output part 200.

Preferably, a funnel-shaped guide member 240 is installed at a downstream side of the driving roller 320, i.e., a distal end of the extruder, in the filament supply direction which is directed from the filament supply part 100 toward the filament output part 200. The guide member 240 serves to guide the filament supplied to the filament output part 200 by driving of the driving roller 320 in an accurate direction.

A tube (not shown) formed of a Teflon material is installed between the conveying roller 330 and the guide member 240 of the filament output part 200. The tube is a passage through which the filament is inserted and conveyed from the conveying roller 330 to the guide member 240, and allows the filament supplied from the filament supply part 100 to be accurately conveyed to the introduction port 210 of the filament output part 200.

Here, the tube extends along a circumference of the filament winding bobbin 120 at the inside of the case 110, and forms a filament conveying passage.

Therefore, when the driving motor 310 is driven in the reverse direction, and the filament fixed in the extruder is discharged to the filament supply part 100, the filament may be accurately conveyed along the predetermined conveying passage.

Preferably, the filament winding bobbin 120 has a rib 121 which prevents the filament from being introduced into a gap between the filament winding bobbin 120 and the case 110. The rib 121 vertically protrudes at a radial end of the filament winding bobbin 120, and is disposed to be spaced at a predetermined distance along a circumference of the filament winding bobbin 120.

Due to the rib 121, the filament wound on the filament winding bobbin 120 or the Teflon tube in which the filament is inserted may not be introduced into a gap between the filament winding bobbin 120 and the case 110, and thus the filament may be smoothly conveyed.

Meanwhile, a second detecting sensor 250 which detects the presence of filament is installed between the filament output part 200, i.e., the introduction port 210 of the extruder and the driving motor 310. And when the driving motor 310 is rotated in the reverse direction, the driving motor 310 is controlled to be driven until the second detecting sensor 250 does not sense the filament.

Due to an operation of the second detecting sensor 250 and the driving motor 310, the filament fixed in the filament output part 200 is discharged in the reverse direction and then the end of the filament may be prevented from passing through the filament output part 200 and being introduced into the filament supply part 100.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. An apparatus for feeding/discharging a filament for a 3D printer, comprising:
   a filament supply part which winds the wire-shaped filament and supplies the wound filament;
   a filament output part which outputs a three-dimensional printed matter by melting and discharging the filament supplied from the filament supply part; and
   a driving part which supplies the filament from the filament supply part to the filament output part, and discharges the filament from the filament output part toward the filament supply part,
   wherein the driving part comprises a driving motor which is provided at the filament output part to generate a driving force and thus to adapt the filament to be conveyed in a normal direction or a reverse direction; a driving roller which is provided at the filament output part to receive the driving force of the driving motor and to convey the filament in the normal direction or the reverse direction; a conveying roller which is provided at the filament supply part to receive the driving force of the driving motor and to convey the filament in the normal direction or the reverse direction; and transmission gears which are provided between the driving motor and the driving roller and between the driving motor and the conveying roller to transmit the driving force of the driving motor to the driving roller and the conveying roller.

2. The apparatus of claim 1, wherein the filament output part has a first detecting sensor which detects the filament, and the driving part has a clutch which is installed between the driving motor and the conveying roller to selectively transmit the driving force of the driving motor to the conveying roller, and
   when the driving motor is rotated in the normal direction, the clutch is maintained in an ON state until the first detecting sensor senses the filament, and transmits the driving force of the driving motor to the conveying roller, and after the first detecting sensor senses the filament, the clutch is in an OFF state, and when the driving motor is rotated in the reverse direction, the clutch is always in the ON state.

3. The apparatus of claim 1, wherein the filament supply part comprises a case which has a filament output port formed at one side thereof; a filament winding bobbin which is rotatably installed at an inside of the case to wind the filament; and the conveying roller which is installed at an opposite side to the filament output port to form a filament conveying passage having a predetermined length or more between the filament output port and the conveying roller.

4. The apparatus of claim 3, wherein the conveying roller comprises a first roller which is driven by the driving motor; and a second roller which has a larger diameter than that of the first roller, and has a radius overlapped with a part of the radius of the first roller so that a part of the first roller is pressed and deformed.

5. The apparatus of claim 1, wherein the filament output part is an extruder comprising an introduction port through which the filament supplied from the filament supply part is introduced, a heat means which melts the filament introduced through the introduction port, and a discharge port through which the melted filament is discharged, and
   a funnel-shaped guide member which guides the filament supplied from the filament supply part to the filament output part is installed at a distal end of the extruder.

6. The apparatus of claim 5, further comprising a tube which extends along a circumference of the filament winding bobbin between the conveying roller and the guide member of the filament output part, and forms a filament conveying passage into which the filament is inserted.

7. The apparatus of claim 5, wherein a vertically protruding rib is provided at a radial end of the filament winding bobbin to prevent the filament from being introduced into a gap between the filament winding bobbin and the case.

8. The apparatus of claim 5, wherein a second detecting sensor which detects the presence of the filament is installed between the introduction port of the extruder and the driving motor, and when the driving motor is rotated in the reverse direction, the driving motor is driven until the second detecting sensor does not sense the filament.

9. The apparatus of claim 2, wherein the filament output part is an extruder comprising an introduction port through which the filament supplied from the filament supply part is introduced, a heat means which melts the filament introduced through the introduction port, and a discharge port through which the melted filament is discharged, and a funnel-shaped guide member which guides the filament supplied from the filament supply part to the filament output part is installed at a distal end of the extruder.

10. The apparatus of claim 9, further comprising a tube which extends along a circumference of the filament winding bobbin between the conveying roller and the guide member of the filament output part, and forms a filament conveying passage into which the filament is inserted.

11. The apparatus of claim 9, wherein a vertically protruding rib is provided at a radial end of the filament winding bobbin to prevent the filament from being introduced into a gap between the filament winding bobbin and the case.

12. The apparatus of claim 9, wherein a second detecting sensor which detects the presence of the filament is installed between the introduction port of the extruder and the driving motor, and when the driving motor is rotated in the reverse direction, the driving motor is driven until the second detecting sensor does not sense the filament.

13. The apparatus of claim 3, wherein the filament output part is an extruder comprising an introduction port through which the filament supplied from the filament supply part is introduced, a heat means which melts the filament introduced through the introduction port, and a discharge port through which the melted filament is discharged, and a funnel-shaped guide member which guides the filament supplied from the filament supply part to the filament output part is installed at a distal end of the extruder.

14. The apparatus of claim 13, further comprising a tube which extends along a circumference of the filament winding bobbin between the conveying roller and the guide member of the filament output part, and forms a filament conveying passage into which the filament is inserted.

15. The apparatus of claim 13, wherein a vertically protruding rib is provided at a radial end of the filament winding bobbin to prevent the filament from being introduced into a gap between the filament winding bobbin and the case.

16. The apparatus of claim 13, wherein a second detecting sensor which detects the presence of the filament is installed between the introduction port of the extruder and the driving motor, and when the driving motor is rotated in the reverse direction, the driving motor is driven until the second detecting sensor does not sense the filament.

17. The apparatus of claim 4, wherein the filament output part is an extruder comprising an introduction port through which the filament supplied from the filament supply part is introduced, a heat means which melts the filament introduced through the introduction port, and a discharge port through which the melted filament is discharged, and a funnel-shaped guide member which guides the filament supplied from the filament supply part to the filament output part is installed at a distal end of the extruder.

18. The apparatus of claim 17, further comprising a tube which extends along a circumference of the filament winding bobbin between the conveying roller and the guide member of the filament output part, and forms a filament conveying passage into which the filament is inserted.

19. The apparatus of claim 17, wherein a vertically protruding rib is provided at a radial end of the filament winding bobbin to prevent the filament from being introduced into a gap between the filament winding bobbin and the case.

20. The apparatus of claim 17, wherein a second detecting sensor which detects the presence of the filament is installed between the introduction port of the extruder and the driving motor, and when the driving motor is rotated in the reverse direction, the driving motor is driven until the second detecting sensor does not sense the filament.

* * * * *